(No Model.)
E. HINES.
TANK.
No. 313,867. Patented Mar. 17, 1885.
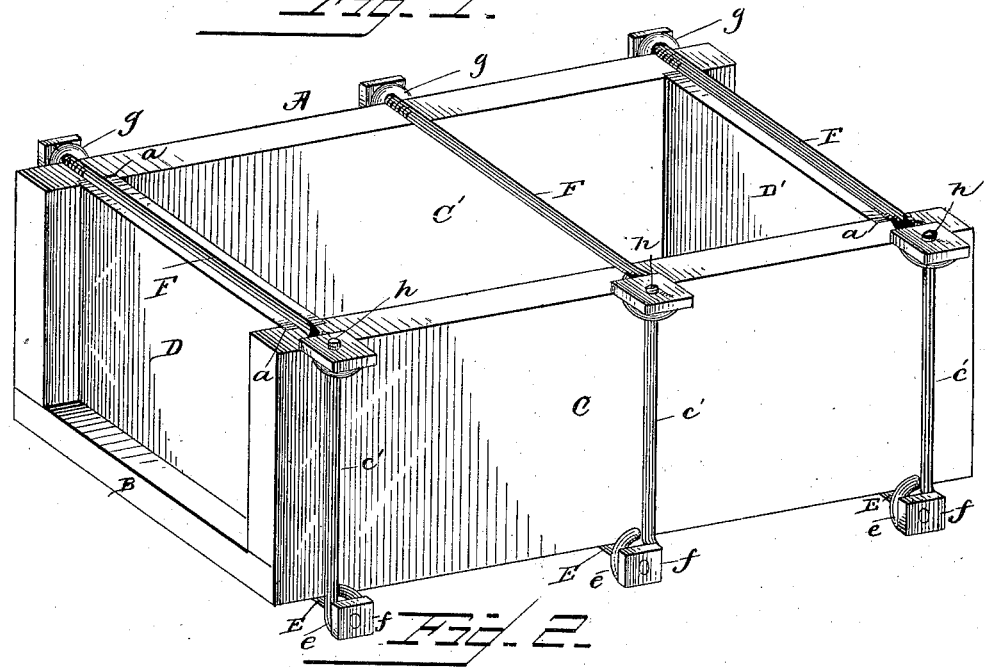
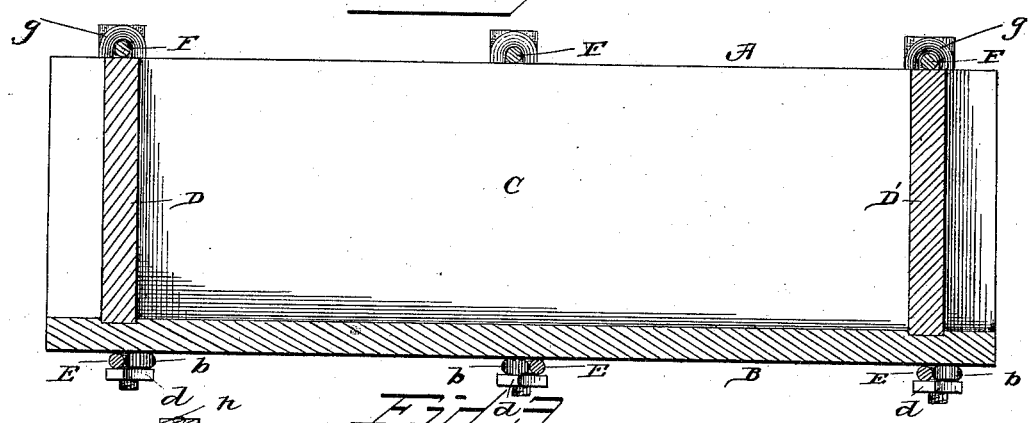
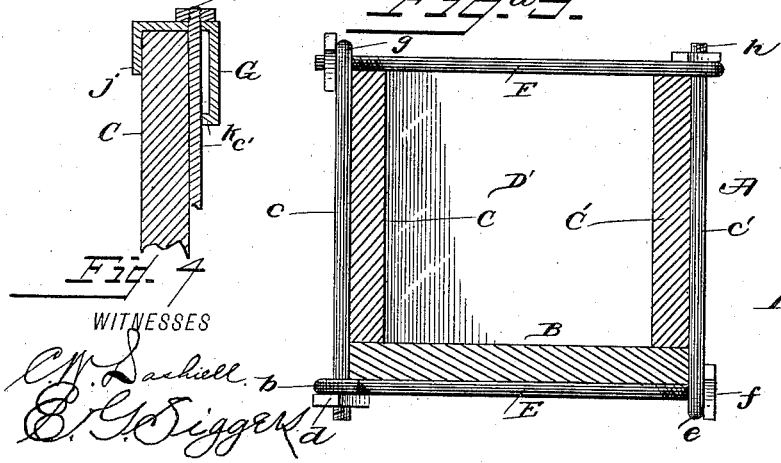
WITNESSES
E. Hines.
INVENTOR
Attorneys
N. PETERS, Photo-Lithographer, Washington, D. C.

United States Patent Office.

ELIJAH HINES, OF BATAVIA, ILLINOIS.

TANK.

SPECIFICATION forming part of Letters Patent No. 313,867, dated March 17, 1885.

Application filed January 26, 1885. (No model.)

*To all whom it may concern:*

Be it known that I, ELIJAH HINES, a citizen of the United States, residing at Batavia, in the county of Kane and State of Illinois, have invented a new and useful Improvement in Tanks, of which the following is a specification, reference being had to the accompanying drawings.

My invention relates to a tank for containing liquids; and it has for its object to provide a device for this purpose which shall be cheap and simple in its construction, effective in its operation, and one that will be strong and durable; and, further, to provide a tank whereby shrinkage or expansion may be compensated for by the securing means.

With these ends in view the invention consists in the improved construction and combinations of parts, hereinafter fully described, and pointed out in the claims.

In the drawings, Figure 1 is a perspective view of a tank constructed in accordance with my invention. Fig. 2 is a longitudinal vertical section of the same, and Fig. 3 is a transverse vertical section. Fig. 4 is a view of a modification.

In the accompanying drawings, in which like letters of reference indicate corresponding parts in all the figures, A represents the tank, which consists of the bottom B, the sides C C', and the end boards, D D', said end boards being fitted between the side boards, and having their ends fitting in grooves or recesses $a$ of the same, the end boards resting upon the upper side of the bottom.

At suitable points upon the bottom of the tank are arranged rods E, said rods having a loop, $b$, at one end, and threaded at their other ends.

Arranged upon the sides of the tank are rods $c$ $c'$, the rods $c$ having threaded ends and fitting in the loops of one of the ends of the rods E, in which they are held by nuts $d$, while the rods $c'$ have loops $e$ at their lower ends to receive the threaded ends of the said bars, said bars E being held by nuts $f$. The bars $c$ have loops $g$ at their upper ends, while the bars $c'$ have threaded upper ends, $h$.

Upon the upper side of the tank are arranged, to connect the bars $c$ $c'$, a series of bars, F, having loops at one end and threaded at the other end, the threaded ends fitting in the loops of the bars $c$, while the loops on said bars F receive the threaded ends of the bars $c'$, the several bars or rods being held in place by nuts, as shown.

In the modification shown in Fig. 4 I employ clips at the upper ends of the tank, in lieu of the bars F. The clips G are, as shown, formed with inturned ends $j$, adapted to fit the upper edges of the tank, and with inturned lower ends, $k$, between which and the sides of the said tank the upright rods $c'$ are adapted to pass, said rods passing through openings in the said clips and secured in place by nuts, as shown.

It will be seen that by this construction, should the tank shrink, the nuts may be tightened to compensate for the same, and that should the tank swell or expand the nuts may be loosened.

By the construction shown a tank may be manufactured and supplied at a slight cost. The tank may, when so desired, be readily taken to pieces for transportation, and it is strong and durable.

It will be seen that, if desired, the relative arrangement of the bars may be changed—that is, it is not essential that the bars $c$ have the loops at their upper ends, or that the bars $c'$ have their upper ends threaded, as they might be transposed and used to equal advantage.

Having fully described my invention, what I claim as new, and desire to secure by Letters Patent, is—

A tank consisting of the sides, ends, and bottom, and rods for holding the same together, said rods having loops at one end and screw-threaded at the other end, and nuts for securing said rods together, substantially as set forth.

In testimony that I claim the foregoing as my own I have hereto affixed my signature in presence of two witnesses.

ELIJAH HINES.

Witnesses:
E. S. SMITH,
M. W. SMITH.